US005538196A

United States Patent [19]

Auchincloss et al.

[11] Patent Number: 5,538,196

[45] Date of Patent: Jul. 23, 1996

[54] SPINDLE COIL WINDING MACHINE

[75] Inventors: James B. Auchincloss; J. Joseph Lawes, both of Carol Stream; Terence S. Horler, Streamwood; Randall E. Jones, Carol Stream, all of Ill.

[73] Assignee: Bachi, L.P., Itasca, Ill.

[21] Appl. No.: 254,580

[22] Filed: Jun. 6, 1994

[51] Int. Cl.[6] .............................. H02K 15/04; H01F 7/06

[52] U.S. Cl. .................. 242/445.1; 242/447; 242/443.1; 29/605

[58] Field of Search ................................. 242/7.08, 7.09, 242/7.14, 7.15; 29/605

[56] References Cited

U.S. PATENT DOCUMENTS

| | | | |
|---|---|---|---|
| 3,306,554 | 2/1967 | Henderson | 242/7.15 |
| 4,809,917 | 3/1989 | Tsuchiya | 29/605 X |
| 4,878,628 | 11/1989 | Takeda et al. | 242/7.08 |
| 4,951,889 | 8/1990 | Camardella et al. | 242/7.14 X |
| 5,263,639 | 11/1993 | Lee et al. | 228/176 |
| 5,397,070 | 3/1995 | Yano | 242/7.08 X |

OTHER PUBLICATIONS

Marsilli & Co. spa, Multispindle Winding Machine With Automatic Tag Wrapping, WM 2002/8-10 (advertising material), no date.

Marsilli & Co. spa, Multispindle Winding Machine With Automatic Tag Wrapping, WM 2001/6-100 WM 2002/6-100 (advertising material), no date.

Marsilli & Co. spa, Modular Coil Manufacturing System, L.D.P. (advertising material), no date.

*Primary Examiner*—Michael R. Mansen

*Attorney, Agent, or Firm*—McAndrews, Held & Malloy, Ltd.

[57] ABSTRACT

The coil winding machine is provided with a versatile headstock and spindle plate arrangement in which the headstock includes attachment mechanism and an opening for receiving a spindle plate which carries at one spindle and also includes attachment mechanism for engaging the attachment mechanism of the headstock. When the attachment mechanism of the spindle plates engages the attachment mechanism of the headstock the spindle carried by the spindle plates extends into the headstock and may be engaged by a conventional driving mechanism of the coil winding machine. The coil winding machine is also provided with a lower portion triple axis controller for controlling taping and deadpost mechanisms. The triple axes controller imparts vertical, sideways, and front-to-back motions to each of the taping and deadpost mechanisms for increased versatility to accommodate the increased versatility provided by the headstock and spindle plate arrangement.

15 Claims, 16 Drawing Sheets

SPINDLE COIL WINDING MACHINE

The present invention relates to a coil-winding machine. More particularly, it relates to a coil-winding machine with a replaceable spindle plate. Preferably, the replaceable spindle plate has a particular spindle number or spindle type. The spindle plate is also preferably replaceable so that a second spindle plate having a different spindle number or type may be attached to the winding machine. The coil-winding machine also preferably includes a computer-controlled, triple axes system in its lower portion to accommodate a deadpost and/or taping mechanism.

BACKGROUND OF THE INVENTION

Coil winding machines are used for manufacturing wire wound electronic components, such as inductors, such as solenoids, transformers, relays, and choke coils. Different applications require different inductor characteristics and therefore require different bobbin types, coiling patterns, and taping. Because of the vast array of inductors used in virtually every manufacturing industry, coil winding machines have been created to accommodate numerous winding variations, including variations in wire thickness, taping arrangement, coiling configuration on a bobbin, number of turns of the wire, pitch of the wire, winding speed, acceleration/deceleration of bobbin rotation, winding direction, and the number of bobbins a machine can accommodate at one time.

A typical application for a coil is, for example, a magnetic-core transformer which is a static device containing magnetically coupled windings. Magnetic-core transformers are used in power systems to change values of voltage and current at a single frequency. In communications circuits, magnetic-core transformers are used over a wide band of frequencies to provide (i) direct-current isolation, (ii) signals splitting and combining functions, (iii) specific current or voltage ratios, (iv) impedance matching, and (v) phase inversion.

A transformer has been defined as follows: A static device consisting of a winding, or two or more coupled windings, with or without a magnetic cord, for introducing mutual coupling between circuits. Notes: transformers are extensively used in electric power systems to transfer power by electromagnetic induction between circuits at the same frequency, usually with changed values of voltage and current. *IEEE Standard Dictionary of Electrical and Electronic Terms IEEE Std.*, 100–1972.

Other examples of inductors include magnetic-core inductors and reactors which are static devices containing one or more windings to introduce inductance into an electric circuit. Reactors are used in power circuits primarily to filter alternating current from direct current. Inductors are used in communication systems primarily in frequency-selective circuits.

The existing types of coil winding machines have a dedicated number of spindles. That is, the number of spindles to accommodate bobbins for coiling is not changeable without great expense and difficulty. Should the user require a greater or lesser number of spindles for a particular coil operation, the user must either obtain an entirely different coil winding machine with a different spindle number or perform a major overhaul on the original coil winding machine to reconstruct the spindle and coil-winding area.

Specifically, the headstock of a coil winding machine houses the motors that rotate the spindles and also integrally includes the spindles on a front face. In existing coil winding machines, a headstock is manufactured with a number of spindles to correspond to the machine to be built. A machine calling for a capacity to wind eight coils at a given time will include a headstock having eight spindles. In order to alter the number of spindles on existing coil winding machines, the headstock must be removed to be replaced by a different headstock having a different number of spindles. Such reconstruction is cost-prohibitive and time consuming.

Existing machines also include a deadpost mechanism having the same number of posts as the number of spindles on the headstock.

The deadpost mechanism maintains (1) wire tension before and after the coiling episode and (2) the wire in a ready position for winding a next bobbin after a previous bobbin has been wound and is removed from the spindle and coil-winding area. Accordingly, existing coil winding machines do not contemplate changes of the deadpost mechanism. As with changes in the number of spindles of the headstock, reconstruction of the deadpost mechanism is cost-prohibitive and time consuming. Similarly, should the number of spindles of an existing coil winding machine have taping capability, the taping mechanism must also undergo a major reconstruction to accommodate the new spindle number.

Accordingly, it is an object the present invention to provide a coil winding machine that can manufacture a greater variety of inductors than is presently possible on any one machine.

It is another object of the present invention to provide a coil winding machine that overcomes the problems associated with changing the spindle number or spindle type of prior art coil winding machines.

It is also an object of the present invention to provide a coil winding machine whose spindle number and/or spindle type may be changed quickly and economically.

Yet another object to provide a coil winding machine with taping and deadpost mechanisms that are sufficiently versatile to accommodate the wide range of number of spindles in the coil-winding area.

Another object is to provide a coil winding machine with a lower portion accommodating both a taping mechanism and a deadpost mechanism.

An additional object is to provide a coil winding machine with a taping mechanism in the lower portion with movement that is servoprogrammable in three directions.

A further object is to provide a coil winding machine with a deadpost mechanism in its lower portion with movement that is servoprogrammable in two or three directions.

It is a still further object of the invention to provide a coil winding machine with several different exchangeable spindle plates which can be easily and quickly fitted and attached to the headstock of the coil winding machine. Each spindle plate may accommodate either different types of spindles and/or different number of spindles.

SUMMARY OF THE INVENTION

The coil winding machine of the present invention provides a headstock that is adapted for easily attaching and detaching a spindle plate. A number of spindle plates each having a different type of spindle or spindle number may also be provided. Thus, the coil winding machine of the present invention can be quickly transformed from a machine having one spindle type or number to that having a different spindle type or number to accommodate the requirements and disparate needs associated with the numerous different types of inductors. The coil winding machine of the invention preferably provides for a triple axes controller for the taping and/or deadpost mechanisms located below the coil-winding area. Where the machine must accommodate both the taping and deadpost mechanisms, two separate triple axes controllers are provided and the lower portion of the coil winding machine (i.e., the portion below the coil-winding area) is structured to accommodate both triple axes controllers. The lower portion triple axes controllers are similar to that used in prior art machines in connection with control of the eyelet bar or wire guide bar. Where both taping and deadpost mechanisms are required, the deadpost triple axes controller straddles the taping triple axes controller.

The eyelet bar performs the function of guiding the wire during the coil-winding episode. The eyelet bar is controlled by an upper portion triple axes controller that is servoprogrammable—i.e., computer programmable—providing for infinite positioning. The lower portion triple axes controller is similarly controlled and provides for intricate taping and deadpost operations.

DETAILED DESCRIPTION OF THE INVENTION

Figure 1:
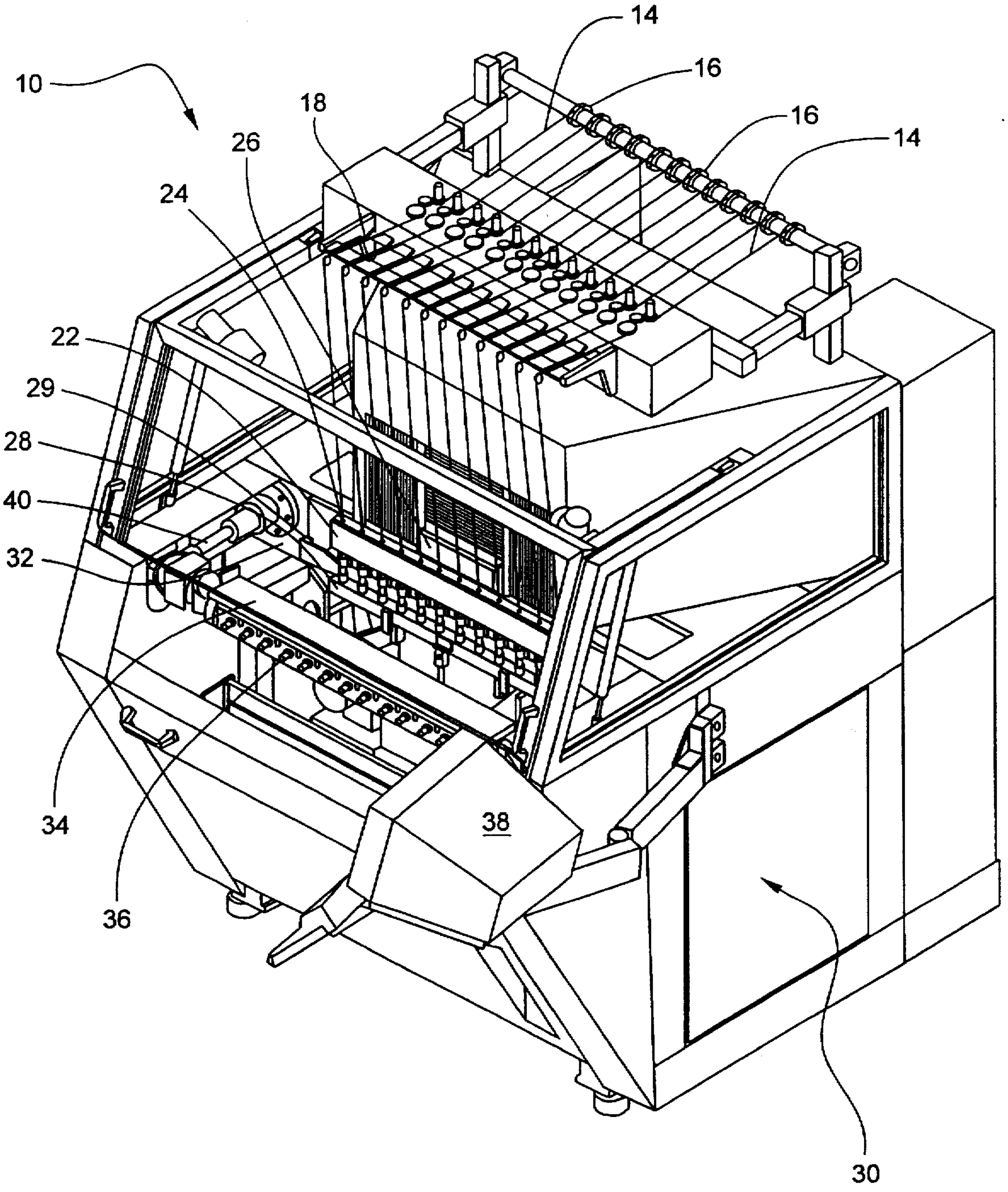
FIG. 1 is a perspective elevated view of the coil winding machine.

FIG. 1 is a perspective elevated view of the coil winding machine 10. The coil winding machine 10 of the present invention is capable of both winding a wire 14 onto a bobbin as well as winding a wire 14 to create a bobbinless coil. The coil winding machine includes a heanium guide 16 to guide the wires onto the machine. It also includes a tensioning device 18 and a deadpost 28 positioned on the front of the machine. The tensioning device 18 and the deadpost 28 together hold the wires 14 in tension. Between the tensioning device 18 and the deadpost 28, the wires pass through the eyelet bar 22 at the coil-winding area. Also, at the coil-winding area, the coil winding machine has a headstock 32 with spindles 80 (FIG. 4) to accommodate the bobbins for winding. The bobbins are also held in place in the coil winding area by the tailstock 34. The operations of the coil winding machine may be controlled by a computer 38.

The coil winding machine 10 receives its wire supply from numerous spools carried by a wire cart (not shown). The wires 14 are fed to the heanium guide 16 at the upper portion of the back of the coil winding machine 10. The wires 14 then pass through a tensioning device 18. The tensioning device 18 maintains the wire in tension for proper coil winding. Each gauge of wire 14 has a tension at which it must be maintained in order to accomplish proper winding or coiling. Tensioning devices such as tensioning device 18 are well known in the art and are not discussed here.

Figure 2:
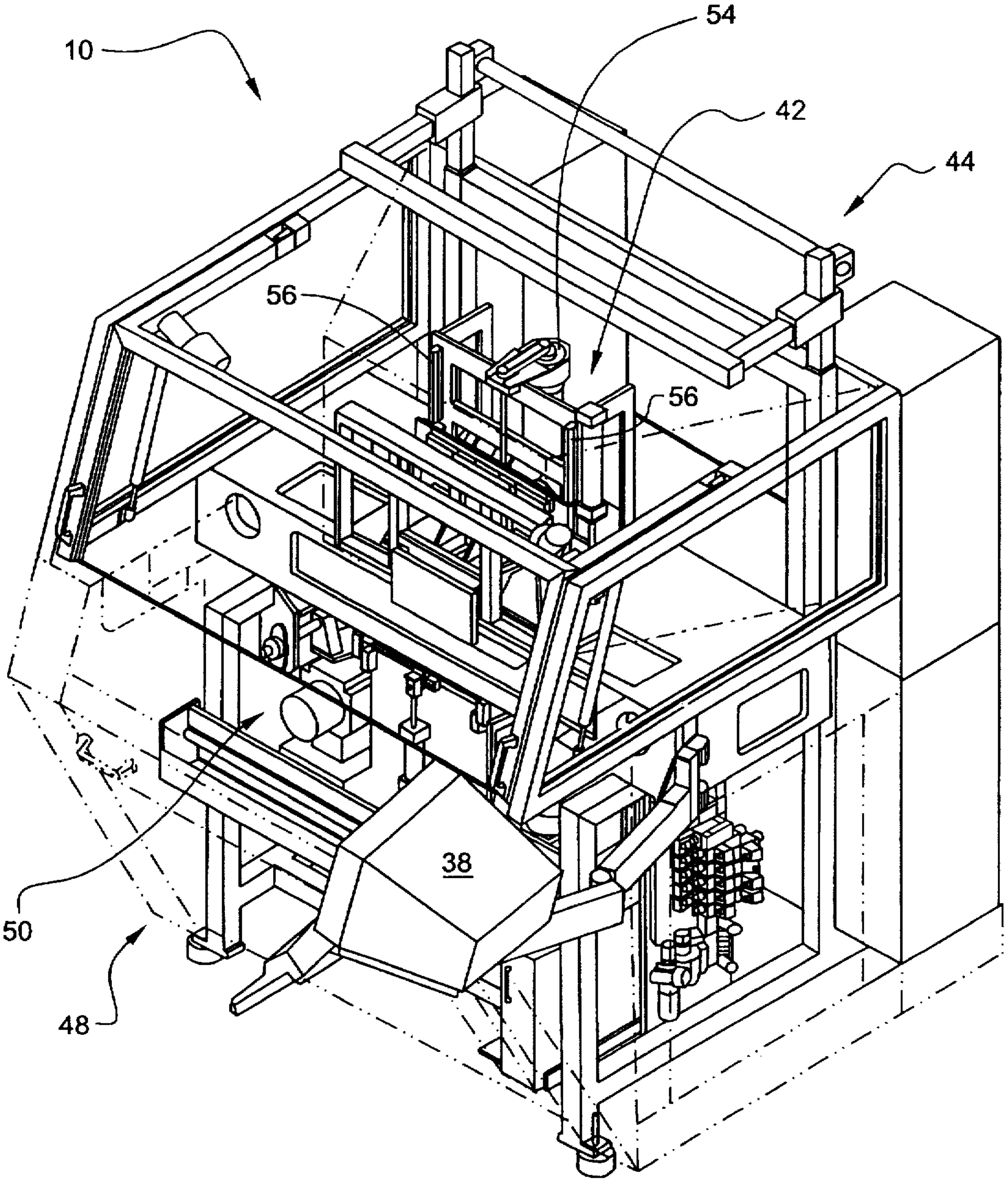
FIG. 2 is a perspective elevated view of the stripped coil winding machine.

The eyelet bar 22 (sometimes referred to as a wire guide bar) includes eyelets 24 in a number sufficient to accommodate the number of wires 14 fed to the coil winding machine 10. The eyelet bar 22 is positioned just above the coil-winding area between the headstock 32 and the tailstock 34. The eyelet bar is attached to attachment plate 26, which in turn is attached to the triple axes controller 42 (FIG. 2). The controller 42 controls movement of the eyelet bar 22 to control the configuration of the coil being wound.

The eyelet bar 22 is long enough to accommodate the wires 14 as they pass from the tensioning device 18 to the deadpost 28. The eyelet bar 22 is only wide enough and high enough to accommodate the eyelets 24 through which the wires 14 pass and to provide stability to the wires 14 as the wires 14 speed through the eyelets 24 during coil-winding. Accordingly, the height of the eyelet bar is about twice that of the width, both of which are substantially less than the length of the eyelet bar 22.

The coil winding machine 10 of FIG. 1 illustrates twelve separate wires 14 being fed through the coil winding machine 10. Accordingly, the eyelet bar 22 possesses at least twelve eyelets 24 to accommodate each of the wires 14. When the coil winding machine 10 is at rest (i.e., no coil winding is taking place) the wires 14 pass through the eyelet 24 of the eyelet bar 22 and are anchored to the deadpost 28 positioned below the eyelet bar 22. The deadpost 28 in combination with the tensioning device 18 maintains the wires 14 at the appropriate tension as designated for the particular gauge of the wires 14. Additionally, the deadpost 28 maintains the wires 14 in an appropriate position to begin a coil winding episode.

As with the eyelet bar, the deadpost 28 is long enough to accommodate the wires 14. The deadpost 28 includes a number of posts 29 which extend upward. The wires 14 are anchored to these posts 29 when no coil is being wound. The posts 29 are cylindrical and are about 4 inches long.

Coil winding takes place by positioning a bobbin (not shown) between the headstock (shown generally at 32) and the tailstock 34. Manipulation of the tailstock 34 is performed by extensions 40. Extensions 40 can move the tailstock 34 toward and away from the headstock 32 and extensions 40 are further adapted to provide the tailstock 34 with rotational movement. Such extensions are well known in the art. Conventional cylinder and toggle linkages may be mounted generally within the body 30 of the coil winding machine 10 and more specifically within the headstock 32. It is understood that these mechanism (not shown) will engage extensions 40 to manipulate the tailstock 34 in a conventional manner which is well known in the art and is not discussed here.

Figure 15:
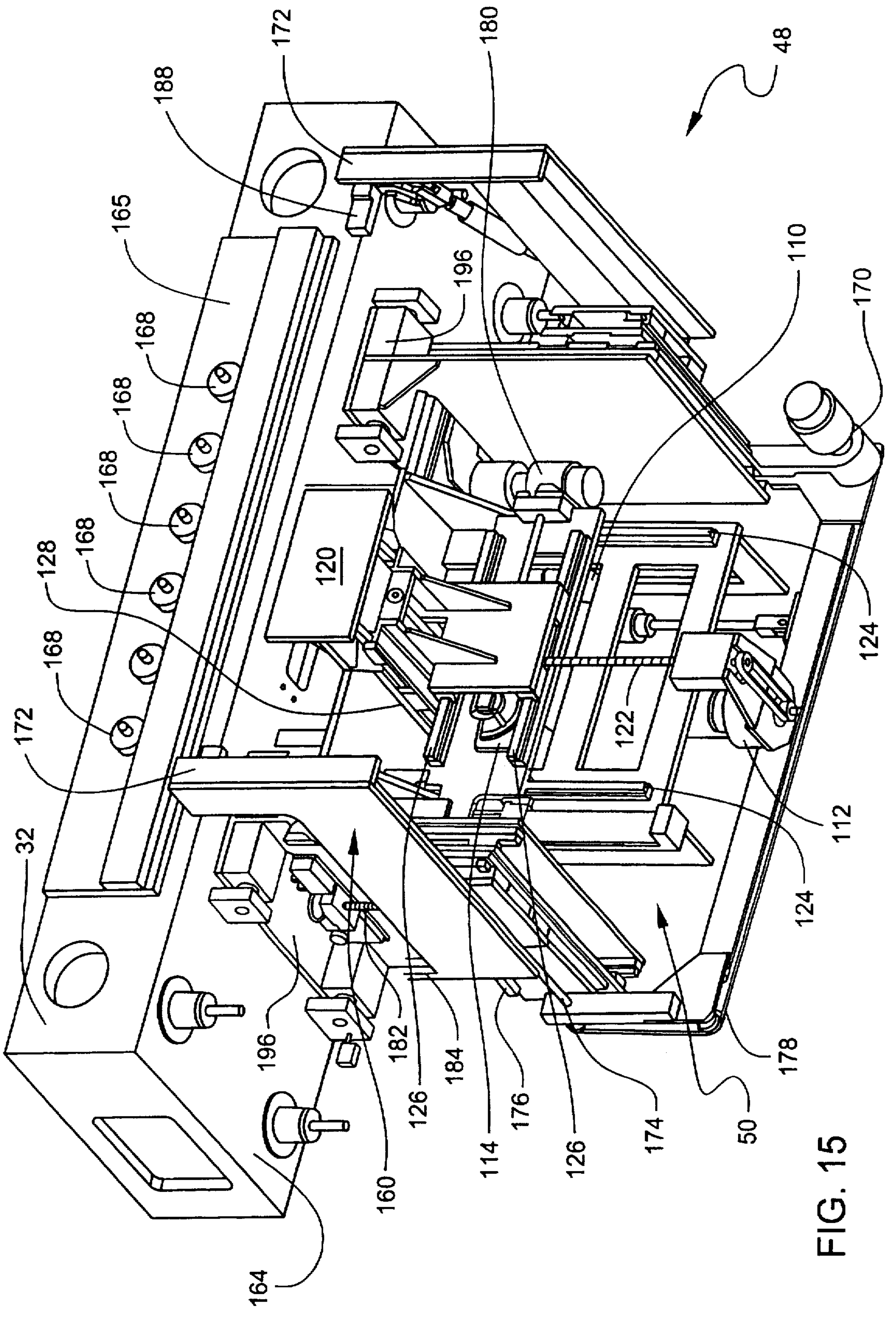
FIG. 15 is an elevated perspective view of the first and second triple axes controllers of the lower portion of the coil winding machine.
Figure 16:
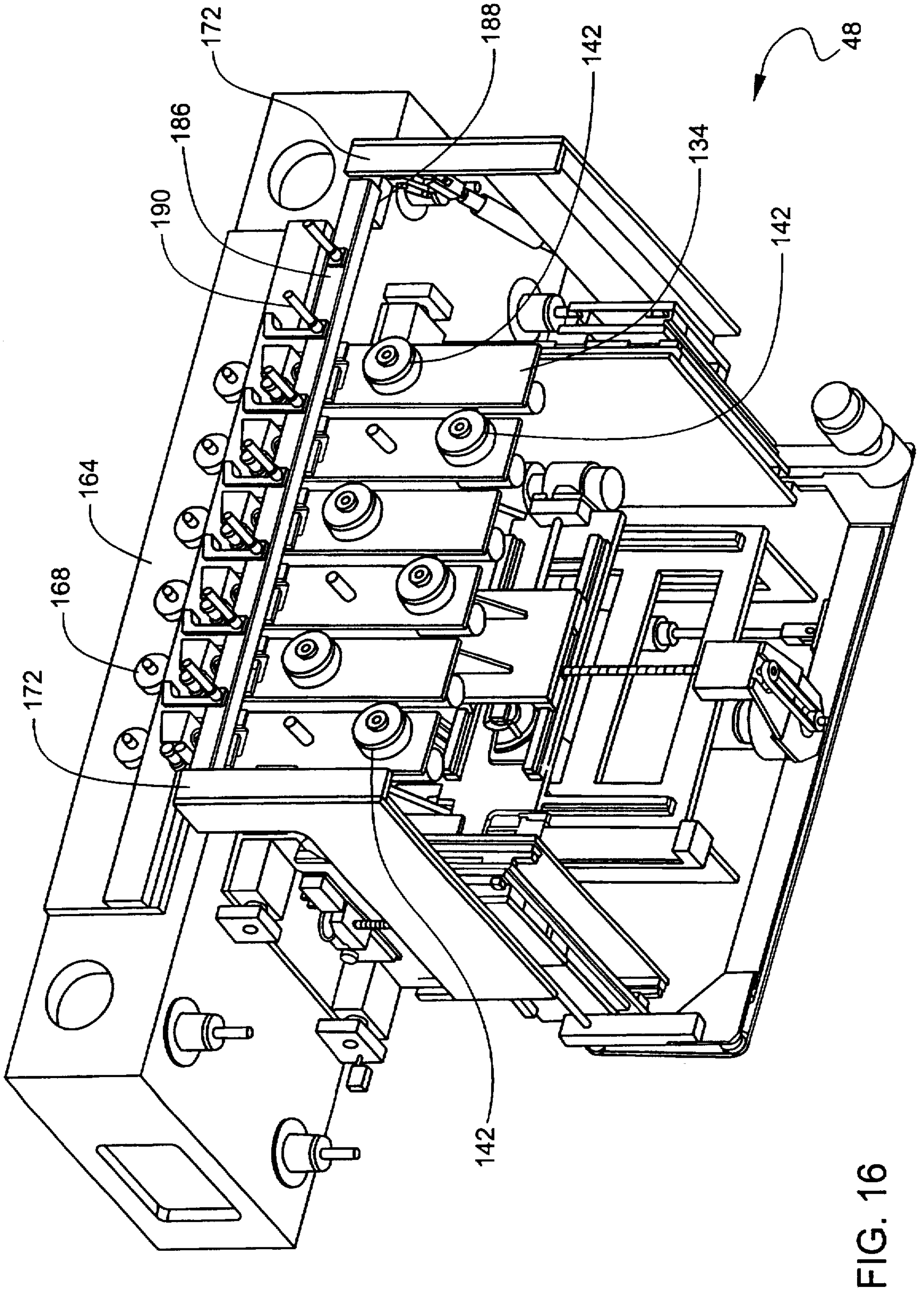
FIG. 16 is an elevated perspective view of the taping mechanism and deadpost mechanism used in connection with the first and second triple axes controllers, respectively, of the lower portion of the coil winding machine.

To commence coil winding, a bobbin (not shown) is placed on the post 36 of the tailstock 34. The extensions 40 rotate the tailstock 34 such that when the extensions 40 move the tailstock 34 toward the headstock 32, the bobbin (not shown) aligns with the spindle nose 90 (FIG. 4) of spindle 80 of spindle plate 66 attached to headstock 32. After the bobbin is firmly held between the tailstock 34 and headstock 32, coil winding may begin. At this time, the wires 14 pass through the eyelets 24 of the eyelet bar 22 and are connected to the deadpost 28. The eyelet bar 22 is then moved (as discussed below) to anchor the wires 14 to the headstock end of the bobbin (not shown). Conventional bobbins include an anchoring pin where the wires 14 are anchored to the bobbin. The wires 14 are then detached from the deadpost 28 by cutting or breaking the wires 14. The deadpost 28 is provided with the capacity to move sideways (laterally). In order to cut or sever the wire 14 from the deadpost 28, the deadpost 28 moves laterally after the wire 14 is attached to the bobbin thus breaking the wire. Movement of the deadpost 28 is discussed below in connection with the triple axes controllers 50 of the lower portion 48 of the coil winding machine 10 (FIGS. 15 and 16). At this time, the deadpost 28 is moved downward so that winding or coiling can take place.

The coiling configuration is dictated by movement of the eyelet bar 22. During coiling the front-to-back position of the eyelet bar 22 dictates where the wire 14 will contact the rotating bobbin. The combination of the movement and position of the eyelet bar 22 and the speed at which the bobbin is rotated dictates how the wire 14 will be wound on the bobbin.

Movement of the eyelet bar 22 is manipulated by a three-motor control system which enables the movement of the eyelet bar 22 vertically, laterally, and front-to-back which defines the XYZ axes. Movement of the eyelet bar 22 can be altered to create various types of coils. Generally, a computer 38 controls the eyelet bar 22 movement. Thus, the eyelet bar 22 is servoprogrammable—i.e., eyelet bar movement is not limited by mechanical stops but instead the eyelet bar 22 can assume any position within the outer limits of each of the X, Y, and Z axes. The X (lateral) axis has a traveling range of six inches; the Y (vertical) axis has a travelling range of six inches; and the Z (front-to-back) axis has a travelling range of six inches. These travelling ranges have been found sufficient to provide the necessary versatility for eyelet bar movement. Programs used in accomplishing this positioning versatility are well known in the art and are not discussed here.

To complete the coil winding episode after the desired coil has been completely wound, the wires 14 are again attached to the bobbin (not shown). This concludes the coil winding episode.

The deadpost 28 is then positioned to detach the wires 14 from the tailstock end of the bobbin. The deadpost 28 is moved vertically upward to stop such that its posts 29 are adjacent the spindle noses 90 (FIG. 4) while the wire 14 is still anchored to the bobbin. The eyelet bar 22 then anchors the wire to the posts 29 of the deadpost. The deadpost 28 is controlled by the triple axes controller 50 of the lower portion 48 of the coil winding machine 10. The controller 50 is described below in connection with FIGS. 11 to 13. The deadpost 28 maintains the wires 14 at the appropriate tension and holding the wire in the coil-winding area for the tailstock 34 to rotate to remove the completed coil and position a new bobbin to be wound in the coil-winding area for the next coil winding episode.

FIG. 2 is a perspective elevated view of the stripped coil winding machine 10. The coil winding machine has been stripped in order to better illustrate the headstock 32 (which is described in detail in connection with FIG. 3), the XYZ triple axes controller 42 of the upper portion 44 of the coil winding machine 10 and the configuration of the lower portion 48 of the coil winding machine 10 which will accommodate the ABC triple axes controller, shown generally at 50.

The XYZ triple axes controller 42 utilizes three separate motors for movement of the eyelet bar 22 in each of the three separate axes. For example, motor 54 can provide vertical movement of the eyelet bar 22 in the Z axis to move the eyelet bar up or down on rails 56. The motors, such as motor 54 of the upper portion 44 of the coil winding machine 10, are controlled by the operator through the computer 38. The computer 38 can be programmed in any number of conventional methods now used to control the motors, and thus the eyelet bar, with extremely accurate maneuverability and movement.

Figure 3:
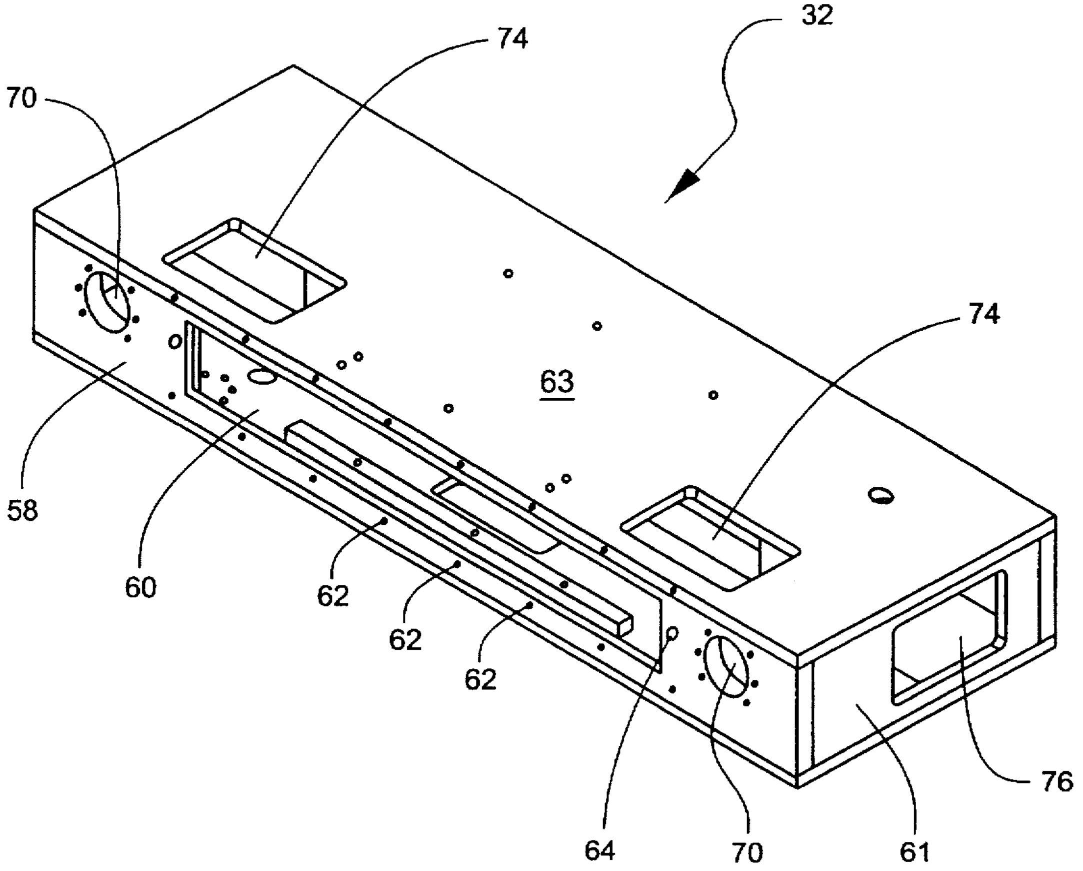
FIG. 3 is a perspective elevated view of the headstock.

FIG. 3 is a perspective elevated view of the headstock 32. Headstock 32 is primarily designed for versatility. Accordingly, headstock 32 includes an opening 60 in combination with screw holes 62 to accommodate any number of spindle plates (see FIGS. 4–9). Headstock 32 also includes circular apertures 70 to accommodate extensions 40 (FIG. 1) that manipulate the tailstock 34. Additional openings 74 and 76 of headstock 32 permit access to the interior of headstock 32. The headstock 32 has six walls including a front wall 58, two side walls 61, a top wall 63, a bottom wall and a back wall. The front wall 58 has the opening 60 and screw holes 62 about the periphery of the opening 60. The opening 60 is generally rectangular in configuration and may have rounded corners, however, the actual configuration is not of critical importance so long as the opening 60 will accommodate the spindles 80 of the spindle plate (FIGS. 4–9). That is, the longer dimension of the rectangular shape is the horizontal dimension. The screw holes 62 are positioned at the periphery of the opening 60 so that the dimensions of the spindle plate need not be much larger than the generally rectangular configuration of the opening 60.

The front wall 58 also includes the two circular apertures 70 through which the extensions 40 (FIG. 1) pass. These apertures 70 are located adjacent opposite sides of the opening 60 and their center points lie on a line parallel to the top wall 63. That is, each aperture 70 is positioned between one of the opposed side walls 61 and the opening 60 at opposite ends of the opening 60. The front wall 58 also includes at least one positioning aperture 64 to enable quick and easy positioning of spindle plates 66, 68 to headstock 32. In operation, the front wall 58 of the headstock 32 will receive spindle plates 66, 68 (FIGS. 4–9) such that the spindle plates 66, 68 can be properly positioned on and attached to the headstock 32 by screws (not shown) which pass through the spindle plates 66, 68 and engage the screw holes 62.

The top wall 63 includes openings 74. Openings 74 are positioned on the top wall 63 adjacent the front wall 58. The side walls 61 include openings 76. Opening 74 and 76 permit access to the interior of the headstock 32 so that the extension 40 (FIG. 1) may be properly connected to the motors (not shown) which control the extensions 40 and the spindles 80 of the spindle plates 66, 68 (FIGS. 4–9) may be connected to the driving means that rotate the spindles 80.

Figure 4:
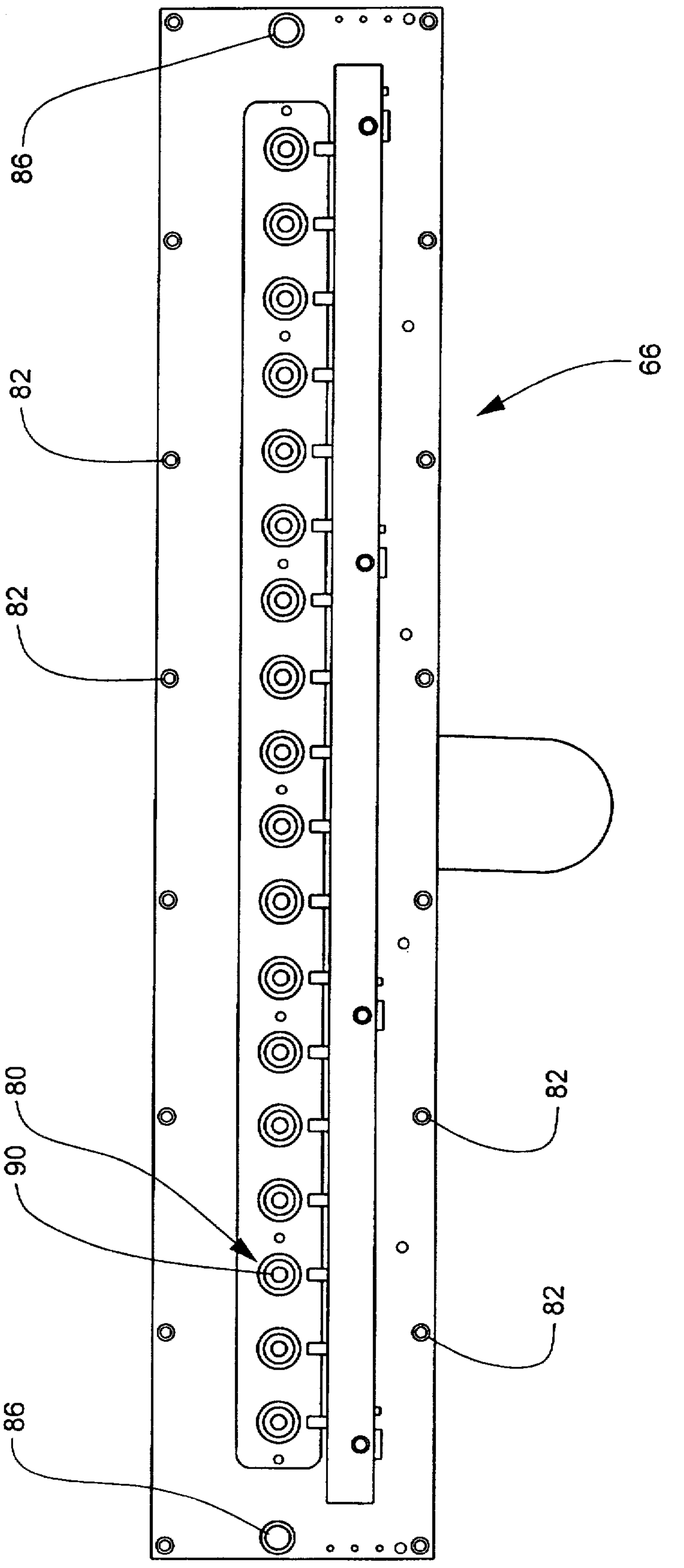
FIG. 4 is an elevated front view of a spindle plate having eighteen spindles.
Figure 5:
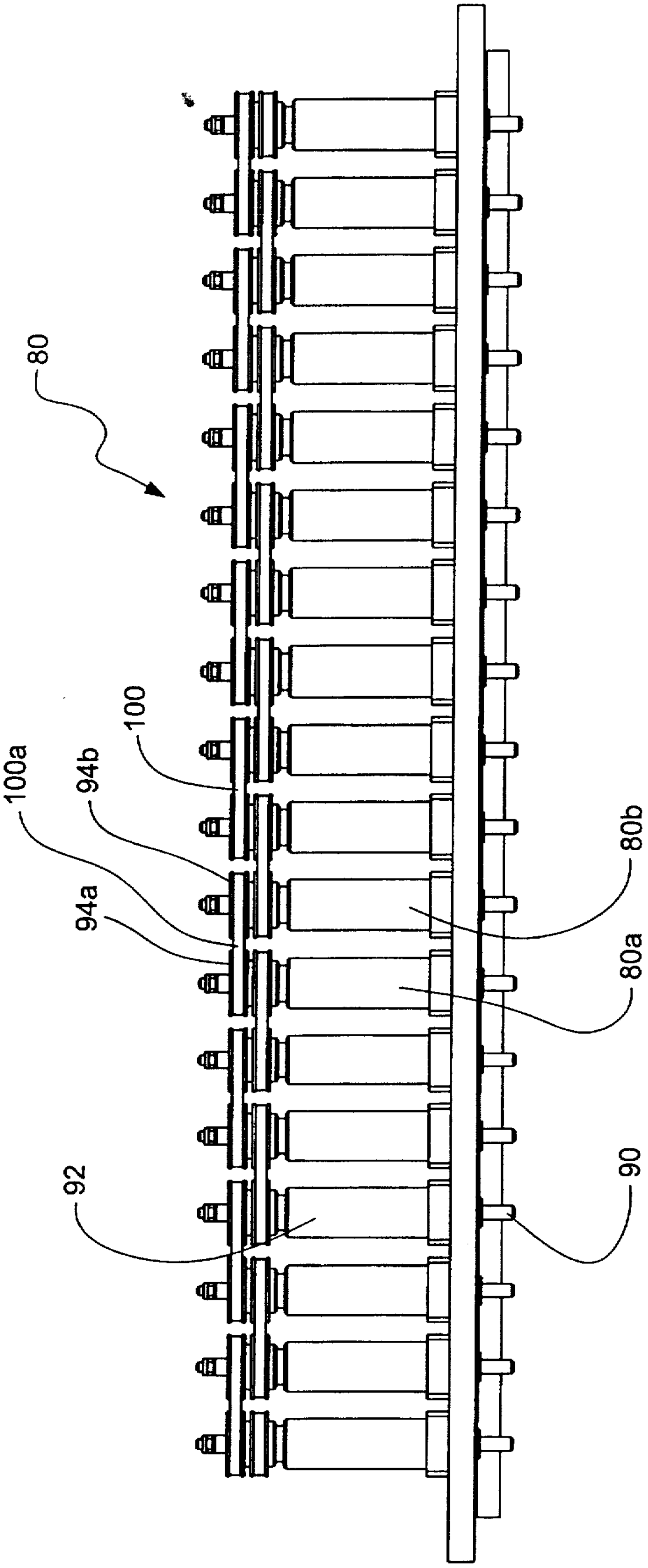
FIG. 5 is an elevated top view of a spindle plate having eighteen spindles.
Figure 6:
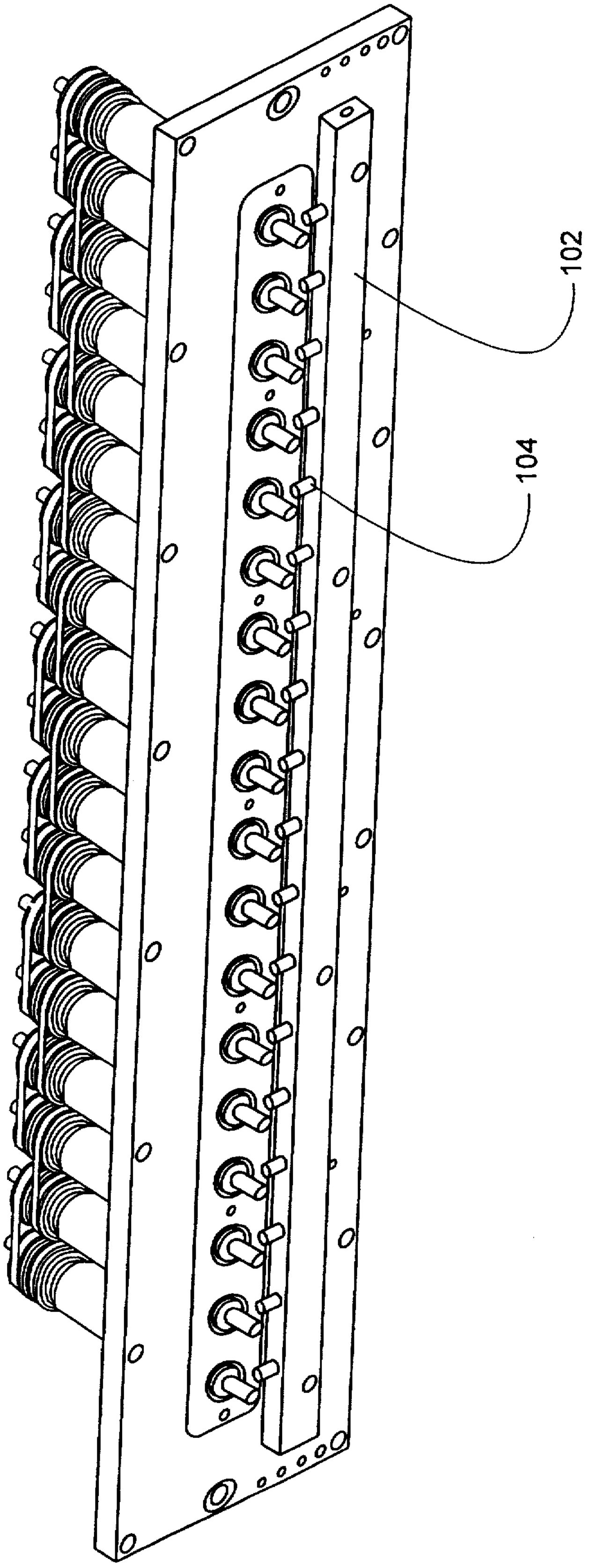
FIG. 6 is a perspective elevated view of a spindle plate having eighteen spindles.
Figure 7:
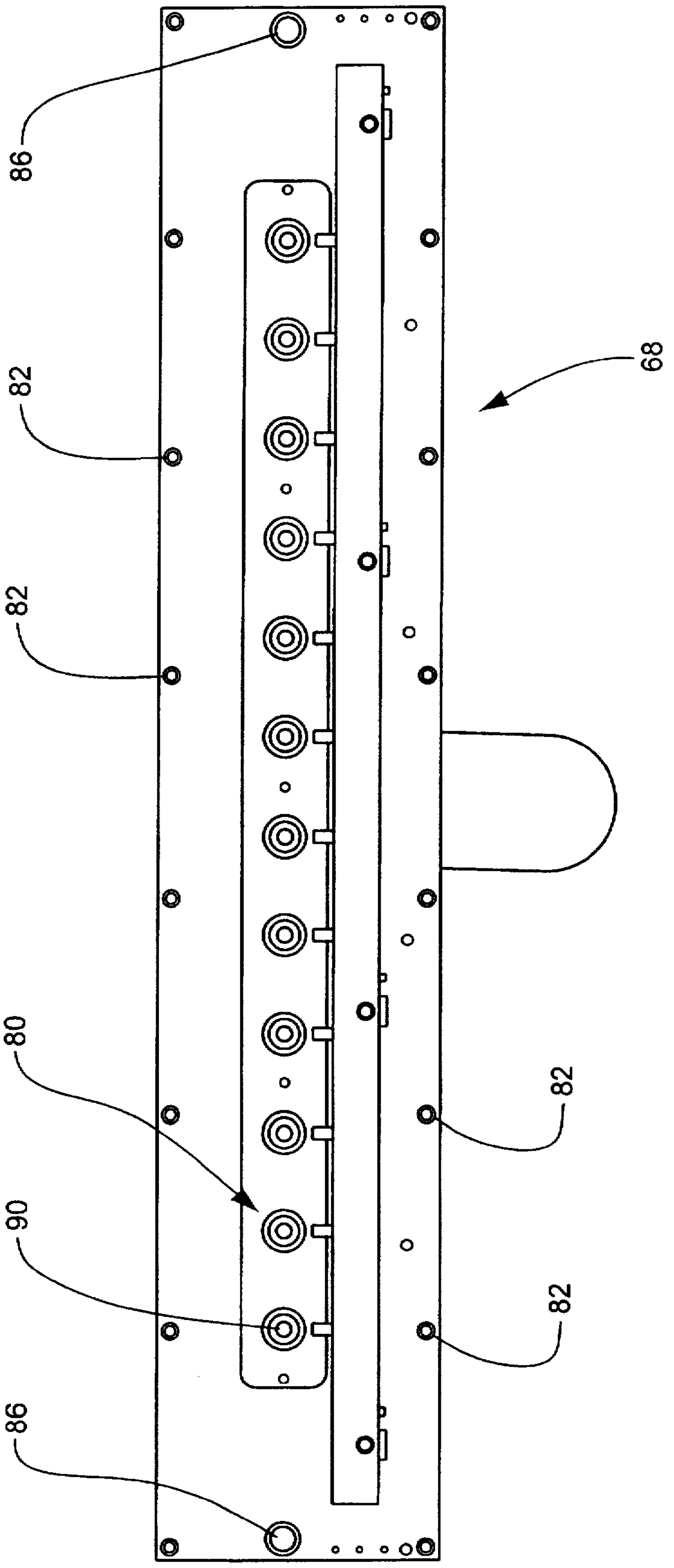
FIG. 7 is an elevated front view of a spindle plate having twelve spindles.
Figure 8:
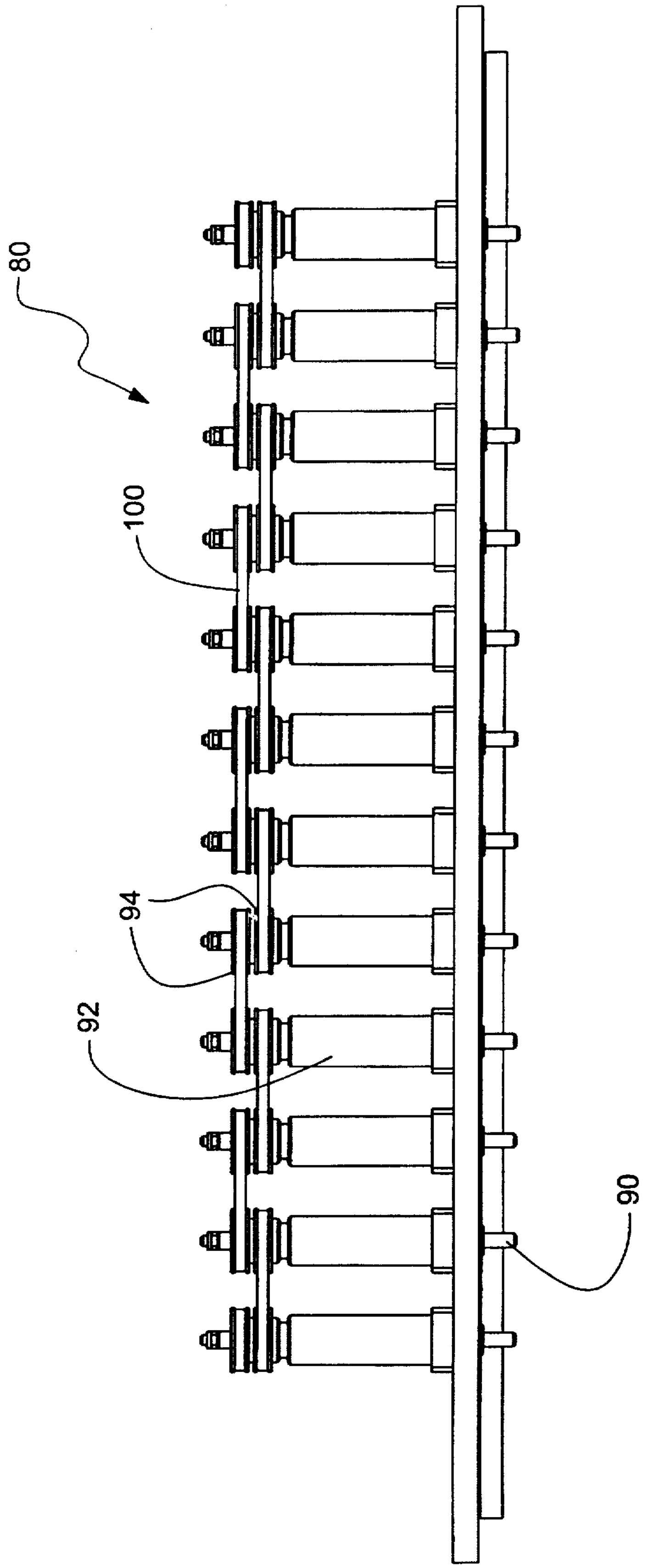
FIG. 8 is an elevated top view of a spindle plate having twelve spindles.
Figure 9:
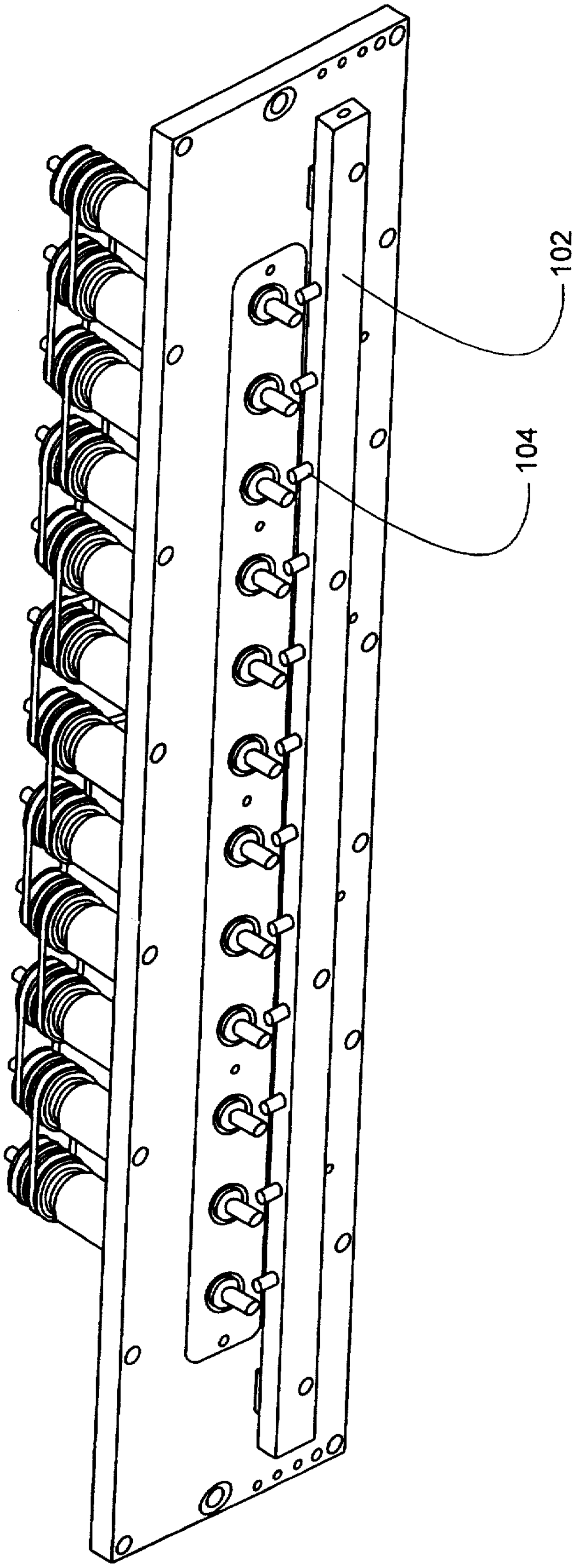
FIG. 9 is a perspective elevated view of a spindle plate having twelve spindles.

FIGS. 4–9 show various views of spindle plates having twelve and eighteen spindles. FIGS. 4 and 7 are elevated front views of the spindle plates having eighteen spindles and twelve spindles, respectively. FIGS. 5 and 8 are elevated top views of the spindle plates 66, 68 having eighteen and twelve spindles, respectively. FIGS. 6 and 9 are perspective elevated views of the spindle plates 66, 68 having eighteen and twelve spindles, respectively.

Referring to FIGS. 4, 5, and 6, spindle plate 66 with eighteen spindles 80 includes a plurality of screw holes 82 through which screws (not shown) may pass to engage screw holes 62 of headstock 32 (FIG. 3). Spindle plate 66 is also provided with at least one positioning aperture 86. The positioning aperture 86 of spindle plate 66 aligns with the positioning aperture 64 of headstock 32 such that spindle plate 66 can be easily and quickly positioned onto the headstock 64 so that screws (not shown) can be easily inserted to engage screw holes 82 of spindle plate 66 and screw holes 62 of headstock 32 to attach spindle plate 66 to headstock 32.

FIGS. 5 and 6 show how spindles 80 extend from spindle plate 66. The spindles consist of a spindle nose 90 and a back portion 92. Back portion 92 includes pulleys 94 that when rotated cause the spindle nose 90 to rotate as well. Each spindle 80 has two pulleys 94. The pulleys 94 are connected to the pulleys 94 of adjacent spindles by belts 100. The distal pulleys 94*a*, 94*b* of each of the two center most spindles 80*a*, 80*b* are attached to a driving motor (not shown) by belt 100*a* which drives the pulleys 94 of the centermost spindles 80 which then in turn drive the pulleys 94 of the remaining spindles 80. This spindle construction and driving operation are well known in the art.

Spindle plate 66 also includes a position locking bar 102 which is located immediately below the spindle noses 90 of spindles 80. The position bar 102 includes locking pins 104 to assist in orienting the spindles 80 at the home position or any other desired position. The position locking bar 102 extends the entire length of the spindle plate 66 and includes one locking pin 104 for each spindle 80 on the spindle plate 66.

Coil winding machine 10 of FIG. 1 is illustrated with twelve wires 14 being fed through the machine. The present invention naturally contemplates any number of wires greater or less than twelve including eighteen wires.

Referring to FIGS. 7–9, spindle plate 68 with twelve spindles 80 is illustrated in various views. The construction and description of spindle plate 66 with eighteen spindles 80 is equally applicable to spindle plate 68 with twelve spindles.

Figure 10:
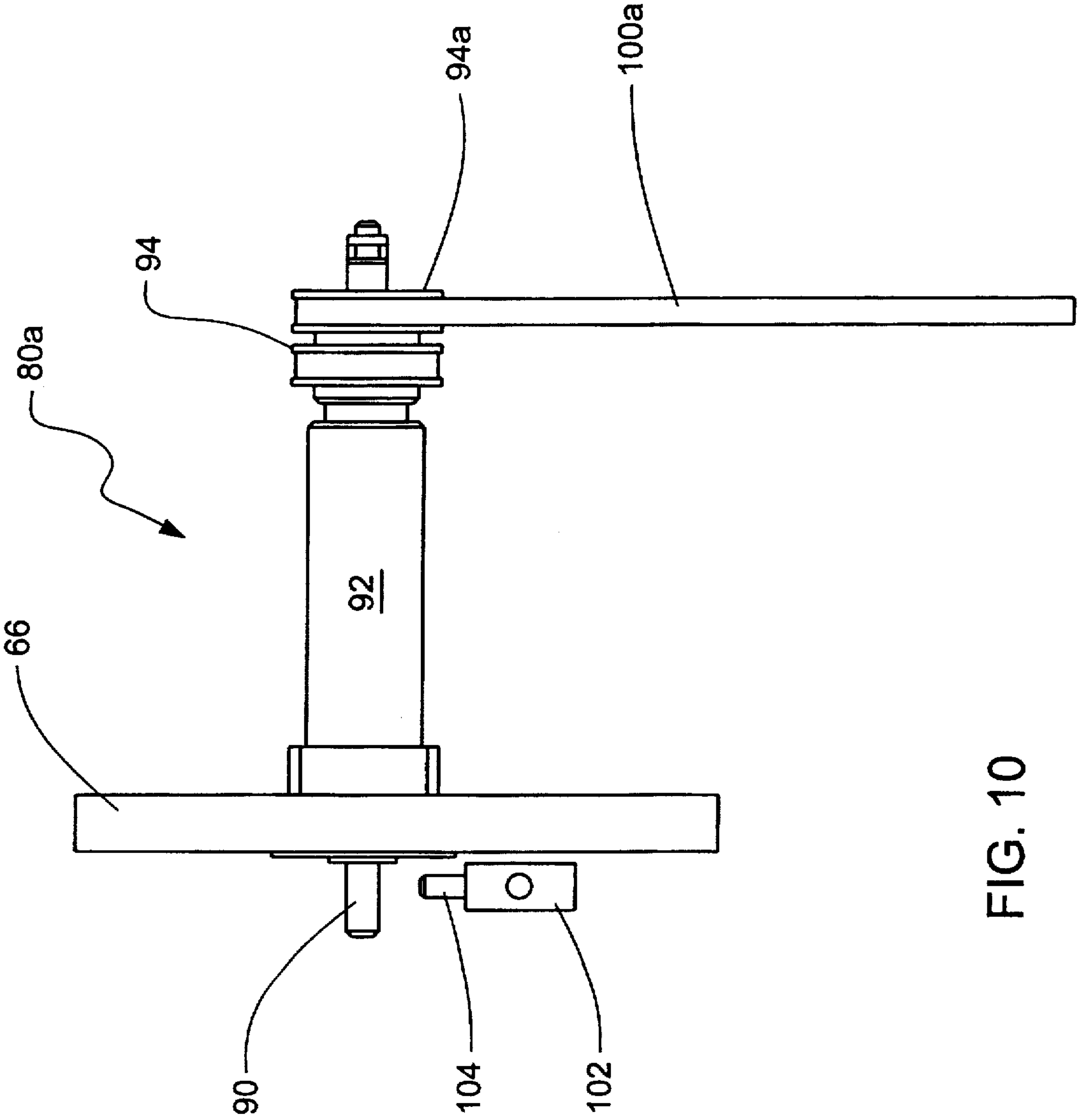
FIG. 10 is a spindle as used on the spindle plates.

FIG. 10 is a spindle 80 as used on the spindle plates 66, 68. FIG. 10 shows the position of the position locking bar 102 and locking pin 104 in relation to the nose 90 of the spindle 80*a*. The back portion 92 of the spindle 80*a* extends away from spindle plate 66. Spindle 80*a* includes pulleys 94, 94*a* at the distal end of the back portion 92. One of the pulleys 94*a* is shown with an extended belt 100*a*. This belt 100*a* can be attached to a driving motor (not shown) to drive the spindle 80*a*. Generally, the driving motor directly drives the two center spindles 80*a*, 80*b* (FIG. 5) which in turn drive the remaining spindles 80 by belts 100.

Referring back to FIG. 3, the spindle plate 66 can be positioned on headstock 32 by aligning and engaging positioning aperture 86 of spindle plate 66 with the positioning aperture 64 of headstock 32. Spindles 80 of spindle plate 66 will then extend into headstock 32 through opening 60. Access to the back portions 92 of spindles 80 is had through openings 74, 76 so that pulleys 94 of spindles 80 can be properly attached to a driving motor (not shown). The driving motor is held within the body of the coil winding machine 10 (FIG. 1). The driving motor is a conventional motor well known in the art and engages pulleys 94*a*, 94*b* of spindles 80*a*, 80*b* in a convention manner using belt 100*a* (FIG. 5). This pulley-driving arrangement is also well known in the art and is not discussed here.

Screws (not shown) are then used to screw the spindle plate 66 to headstock 32 by engaging screw holes 82 of spindle plate 66 and screw holes 62 of headstock 32. Although the preferred embodiment has been described as utilizing positioning apertures and screw holes, the present invention contemplates other types of attachment means. For example, the positioning apertures may be replaced by a peg and insert hole arrangement for positioning of the spindle plate on the headstock. Also, the spindle plate can be attached to the headstock in other manners such as a tongue and groove arrangement or other attachment means well known in the art.

Figure 11:
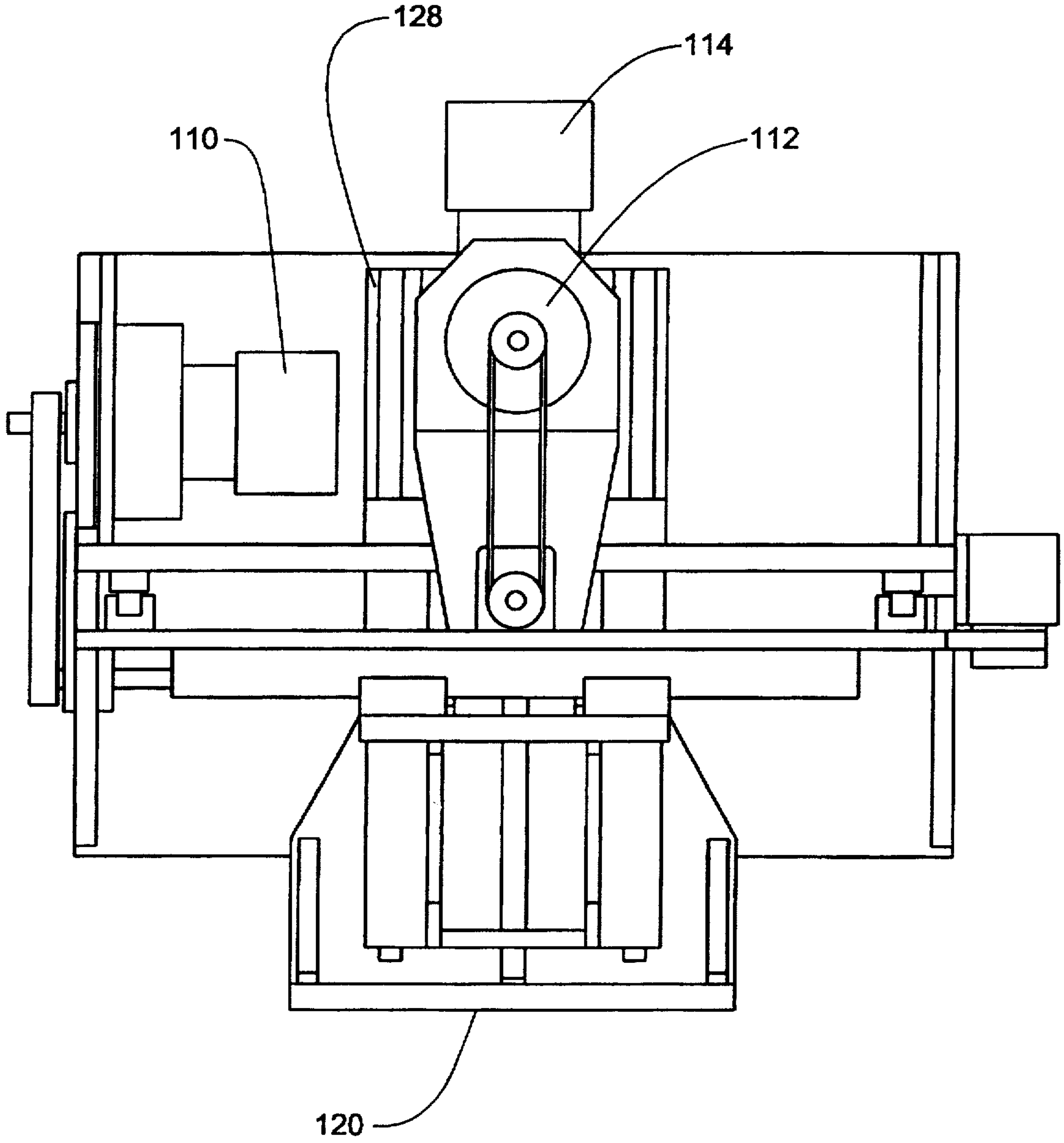
FIG. 11 is an elevated bottom view of the first triple axes controller of the lower portion of the coil winding machine.

FIG. 11 is an elevated bottom view of the first triple axes controller 50 of the lower portion 48 of the coil winding machine 10. Controller 50 operates in generally the same manner as XYZ triple axes controller 42 of upper portion 44.

Three motors 110, 112, and 114 control the movement of attachment plate 120. Vertical motor 112 imparts vertical motion to attachment plate 120. Lateral motor 110 imparts lateral (sideways) motion to attachment plate 120. Front-to-back motor 114 imparts front-to-back motion to attachment plate 120. The vertical, lateral, and front-to-back axes in which attachment plate 120 may move define an ABC axes. The first triple axes controller 50 provides for a six inch travelling range in the A (front-to-back) axis, a six inch travelling range in the B (lateral) axis, and a six inch travelling range in the C (vertical) axis. These travelling ranges have been found sufficient to perform the intricate taping and deadpost maneuvers and movements required of the present invention.

Figure 12:
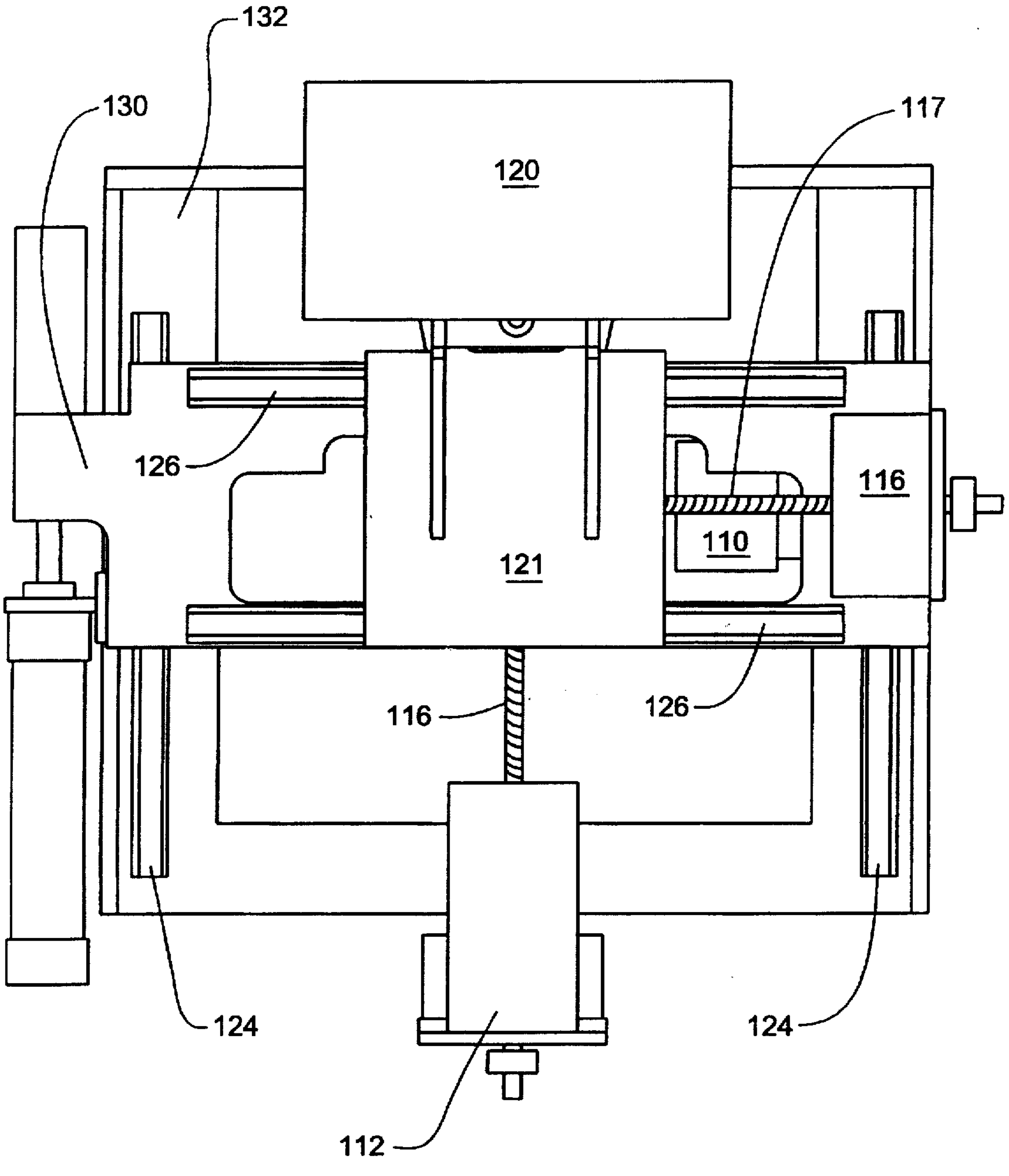
FIG. 12 is an elevated front view of the first triple axes controller of the lower portion coil winding machine.

FIG. 12 is an elevated front view of the first triple axes controller 50 of the lower portion 48 of the coil winding machine 10. Vertical motor 112 and lateral motor 110 are prominent from this elevated front view. Also conspicuous are vertical rails 124 and horizontal rails 126. Attachment plate 120 is mounted on a first mounting plate 121. The first mounting plate 121 in turn is slidably mounted on the horizontal rails 126 on a second mounting plate 130. Lateral motor 110 is also mounted to the second mounting plate 130. Lateral motor 110 imparts horizontal movement to the first mounting plate 121 such that the first mounting plate 121 can be positioned anywhere along horizontal rails 126. The horizontal rails 126 are separated on the second mounting plate 130 to provide stability to the first mounting plate 121 slidably mounted thereon. Lateral motor 110 engages threaded shaft 117 through gear box 116.

The second mounting plate 130 in turn is mounted on a third mounting plate 132 which has vertical rails 124. Vertical motor 112 is also mounted on the third mounting plate 132. Vertical rails 124 run parallel to each other and are spaced apart nearly the length of the second mounting plate 130 to provide stability to the second mounting plate 130 as it slidingly travels on the vertical rails 124.

The third mounting plate in turn is mounted on the front-to-back rails 128 (FIGS. 11 and 13) which imparts front-to-back motion to the entire assembly of mounting plates.

Figure 13:
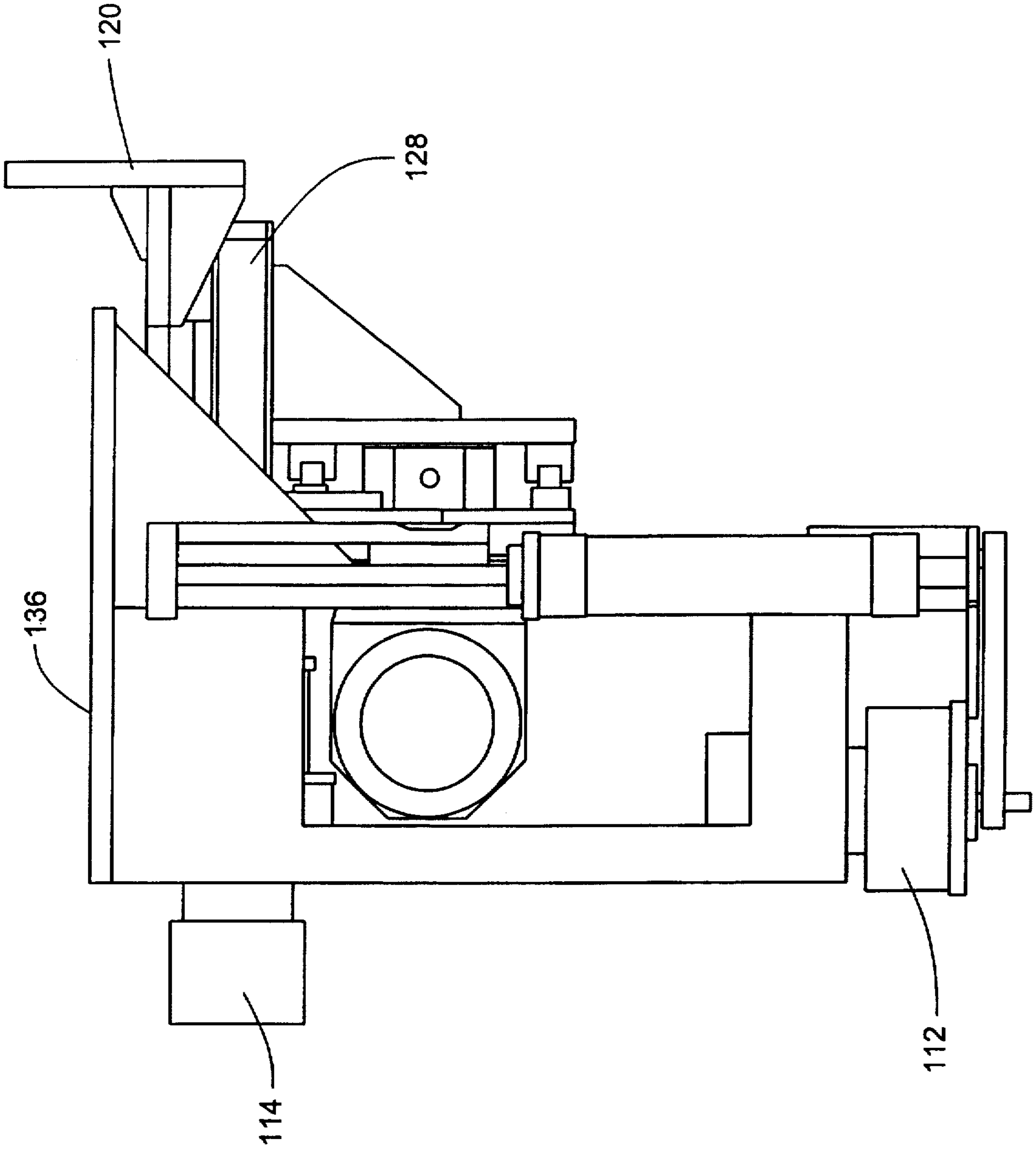
FIG. 13 is an elevated side view of the first triple axes controller of the lower portion of the coil winding machine.

FIG. 13 is an elevated side view of the first triple axes controller 50 of the lower portion 48 of the coil winding machine 10. Front-to-back motor 114 imparts forward and rearward motion to the assembly of mounting plates 121, 130, 132 thus enabling attachment plate 120 to assume any position on front-to-back rail 128.

Movement of each of the motors 110, 112, and 114 is controlled by the computer 38 (FIG. 2) and are thus servo-programmable just as the motors (not shown) of triple axes controller 42 of upper portion 44 (FIG. 2). Each of the motors works in conjunction with a threaded shaft that imparts the respective motion to attachment plate 120. For example, as illustrated in FIG. 12, vertical motor 112 engages vertical threaded shaft 116 to impart vertical motion to attachment plate. Other conventional driving arrangements can also be used. For example, a band and pulley arrangement similar to that described above in connection with spindles 80*a*, b (FIG. 10) may be utilized. The preferred motors used in the triple axes controller 50 are sold by Pacific Scientific under the Model Number 3VM. The motors are attached to the corresponding mounting plate by conventional methods such as screws and the like.

FIG. 13 also shows the top surface 136 of the triple axes controller 50 of the lower portion 48. The top surface 136 is adapted to connect to the underside of the headstock 32 (FIG. 3). It will be understood that the headstock will be constructed of material of sufficient strength to sustain the weight of the triple axes controllers of the lower portion.

Attachment plate 120 is configured to receive either a taping mechanism or deadpost mechanism. Both the taping mechanism and deadpost mechanism to be used with the coil winding machine may be attached to the attachment plate 120 by screws or any other conventional attachment means.

Figure 14:
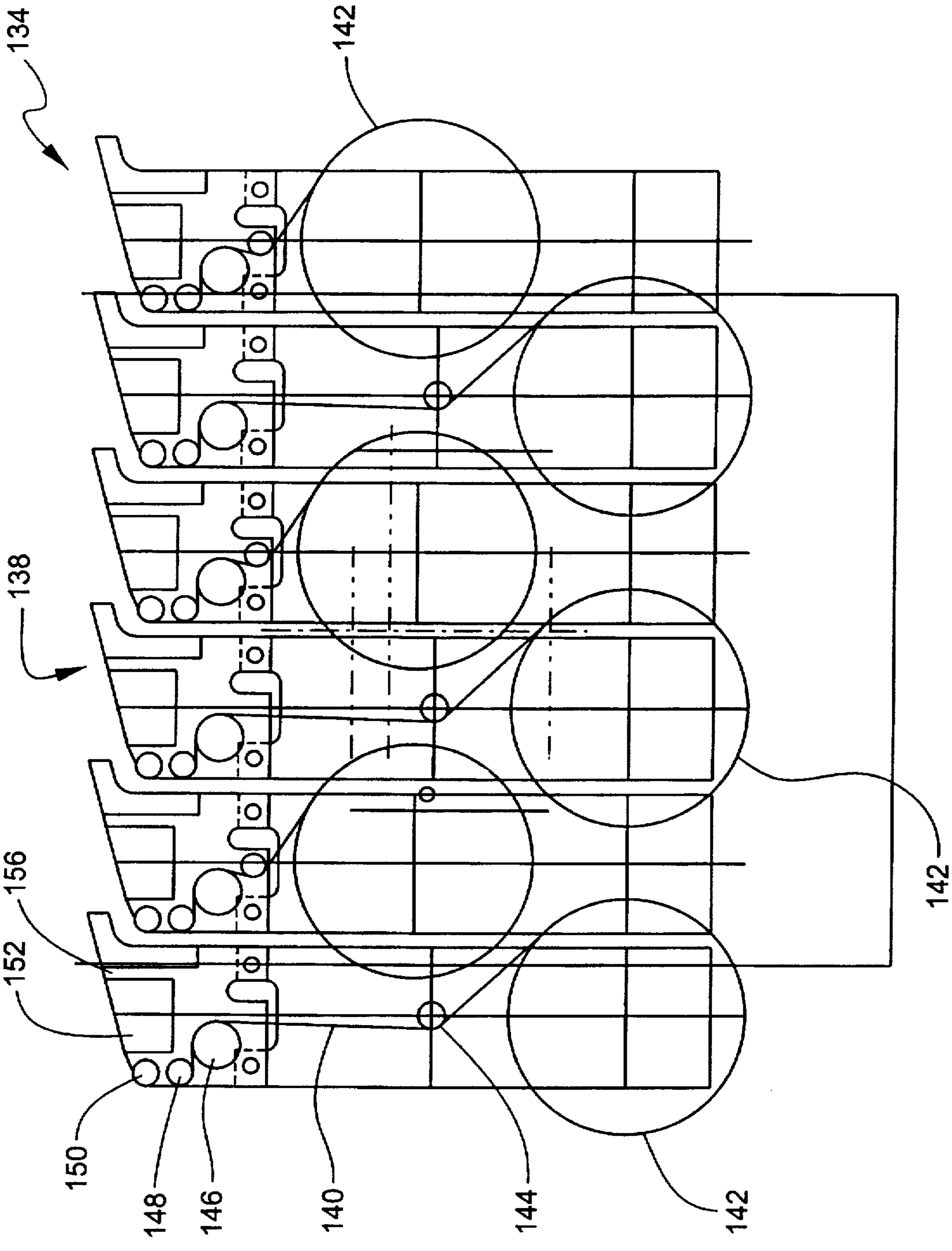
FIG. 14 is an elevated front view of the taping mechanism used in connection with the first triple axes controller of the lower portion of the coil winding machine.

FIG. 14 is an elevated front view of a taping mechanism 134 used in connection with the first triple axes controller 50 of the lower portion 48 of the coil winding machine 10. Taping mechanism 134 may include six tape rolls 142 and six applicators 138 for applying the tape 140 to the coils (not shown). As a result of the versatility and maneuverability of the first triple axes controller 50 of the lower portion 48 of the coil winding machine 10.

Tape 140 is unwound from the tape rolls 142 to engage in sequence a first pivot 144, a one way clutching device 146, a second pivot 148, a third pivot 150, and a vacuum 152. Taping mechanism 134 is moved on the ABC axes upward to attach tape 142 to coils (not shown), downward to permit taping and to disengage the tape 140 from coils after taping, and can be moved side-to-side and front-to-back to accomplish the intricate taping necessitated by modern-day detailed inductors. Taping mechanism 134 also includes the hot wire cutter 156 for cutting the tape 140 after taping of the coil has been accomplished.

Similarly, a deadpost mechanism can be attached to attachment plate 120 of the triple axes controller 50 of the lower portion 48 such that deadpost capabilities may also be imparted a triple axes movement controlled by computer 38 (FIG. 2) and thus servoprogrammable.

Preferably, the coil-winding machine 10 of the present invention includes both a taping mechanism as shown in FIG. 14 as well as a deadpost mechanism.

FIG. 15 is an elevated perspective view of the first and second triple axes controllers, shown generally at 50 and 160. FIG. 15 illustrates the spacial configuration of the first triple axes controller 50 and the second triple axes 160 with respect to the headstock 32. The first triple axes controller 50 is mounted to the underside 164 of the headstock 32 so that it may control the taping mechanism (FIG. 14) below the coil-winding area and spindle plate 165.

Regarding first triple axes controller 50, attachment plate 120 is configured to receive the taping mechanism (FIG. 14). Vertical motor 112 imparts vertical motion to attachment plate 120 in conjunction with vertical rails 124 and threaded shaft 122. Lateral motor 110 (partially obscured) imparts lateral movement to attachment plate 120 in conjunction with horizontal rails 126. Front to back motor 114 imparts front to back motion to attachment plate 120 in conjunction with front to back rail 128. The taping mechanism (FIG. 14) contemplated in the present invention is adapted with triple axes movement to accommodate the various taping configurations required of the numerous different types of inductors presently manufactured. Such taping maneuverability is necessary to permit interleaving while the bobbin is still secured in the coil-winding area and while the coil winding machine stands ready to continue the coil winding episode to complete a coil having two separate windings—one below the tape and one above the tape. Such interleaving and coiling configuration is commonly used in manufacturing transformers.

As noted above, the first triple axes controller 50 of the lower portion 48 of the coil winding machine 10 imparts sufficient movement to the attachment plate 120 and hence the taping mechanism (FIG. 14) such that it can fully accommodate the number of bobbins to be wound. The taping mechanism may not possess the same number of tape rolls as bobbins to be wound. That is, because of the increased maneuverability available by the first triple axes controller 50 of the present invention, a taping mechanism having tape rolls in a number less than the bobbins to be wound may still accomplish complete taping of all of the coils on the bobbins. For example, a taping mechanism having five tape rolls can accomplish taping of ten coils. Preferably, the first triple axes controller 50 permits a six inch movement range in each of the axes—vertical, lateral, and front to back. This movement range has been found sufficient to impart the required maneuverability to the taping mechanism called for in performing the taping functions presently required in the manufacture of all inductors requiring taping.

The second triple axes controller 160 of the lower portion 48 of the coil winding machine 10 straddles the first triple axes controller 50. The second triple axes controller 160 accommodates a deadpost mechanism (FIG. 16) and imparts triple axes movement to the deadpost mechanism. Second triple axes controller 160 straddles the first triple axes controller 50 such that both triple axes controllers may be simultaneously mounted to the underside 164 of headstock 132 to perform their respective functions without interfering with the other.

Front to back motor 170 imparts front to back movement to the attachment plates 172 of the second triple axes controller in conjunction with front to back threaded shaft 174 and front to back rail 176. Front to back motor 170 imparts movement to front to back shaft via belt 178. Vertical motor 180 imparts vertical motion to attachment plates 172 in conjunction with vertical threaded shaft 182 and vertical rail 184. Front to back motor 170 and vertical motor 180 impart a six inch range of movement to the deadpost mechanism (FIG. 16) in their respective axes.

Lateral movement of the attachment plates 172 is provided in a conventional pneumatic manner. The deadpost mechanism requires sideways movement for the sole purpose of detaching the wire from the deadpost after the wire has been attached to the bobbin. Conventionally, this has been accomplished by providing the deadpost mechanism with a lateral range of movement of about one inch. The deadpost mechanism does not require any greater maneuverability in this lateral axes and the preferred embodiment of the present invention does not contemplate imparting greater movement to a deadpost mechanism. Of course, it is understood that greater movement can be imparted to the deadpost mechanism by providing a lateral motor similar to that of the taping mechanism and the eyelet bar.

When the straddling axis is used for the deadpost mechanism 186 (FIG. 16), the deadpost mechanism moves left to right only about one inch. Because of the somewhat limited movement of the straddling axis, an additional deadpost is used so that there is a deadpost or tie off point on each side of every coil. When the deadpost mechanism 186 is on the center lower axis and no taping mechanism is used the deadpost mechanism 186 has the same number of posts 190 as spindles on the headstock. On the center axis, the deadpost mechanism is able to move its posts 190 through servo-motion to the opposite sides of corresponding spindles to tie off so that only one post is necessary for each spindle.

FIG. 16 is an elevated perspective view of a taping mechanism and deadpost mechanism used in connection with the first and second triple axes controllers 50, 160, respectively, of the lower portion 48 of the coil winding machine 10. As noted above, the taping mechanism 134 is accommodated with conventional attachment means (not shown) for attaching to attachment plate 120 (FIG. 15). Deadpost mechanism 186 attaches to attachment plates 172 at attachment handle 188. The deadpost mechanism 186 includes seven posts 190. As noted above, because the deadpost mechanism is located on the straddling axis, the deadpost 186 includes one post 190 more than there are spindles 168 on the spindle plate 165.

The taping mechanism 134 is provided with six separate tape rolls 142. In the configuration of FIG. 16, then, each bobbin to be attached to the spindles 168 can be taped by a different tape 142. However, it is understood that should the spindle plate 165 be replaced with a spindle plate having ten spindles, a taping mechanism 134 having five tapes can still accommodate the full taping requirements of each of the bobbins of these ten spindles. This versatility results from the increased maneuverability imparted to the taping mechanism 134 by the first triple axes controller 50 of the lower portion 48 of the coil winding machine. Should the spindle plate 165 be replaced by a spindle plate having twelve spindles, the taping mechanism shifts over so that each tape may then accomplish taping of two coils.

The second triple axes controller 160 is attached to the underside 164 of the headstock 32 at mounting plates 196. Mounting plates 196 are connected to the underside 164 by conventional screws or the like.

The preferred embodiment of a coil winding machine with a replaceable spindle plate and two triple axes controllers in the lower portion of the coil winding machine has been described in detail. It is understood that other embodiments of such a coil winding machine are possible. The scope of the present invention, therefore, is determined by reference to the following claims.

What is claimed is:

1. A coil winding machine of the type usable to wind a wire onto a bobbin mounted on a bobbin spindle, the coil winding machine comprising in combination:

a machine body with an exterior, an inner chamber, a first portion and a first side on the exterior;

a wire tensioning device mounted on the body;

an eyelet bar mounted on the first portion of the body;

a spindle carrier support secured within the inner chamber of the body and comprising a support body, a spindle chamber, a spindle passage through the support body into the interior chamber, and a separable spindle carrier mount;

at least one spindle carrier including a spindle mount and at least one spindle for spinning the bobbin, the spindle mount having a first side and a second side, the spindle having a first end extending from the first side of the spindle mount and including an extension for holding the bobbin, and the second end extending from the second side of the spindle mount and including a portion to be driven to spin the bobbin, the spindle carrier being removably mounted on the separable spindle carrier mount of the spindle carrier support such that the second side of the spindle mount is adjacent the spindle carrier support and the second end of the spindle passes through the support body and into the interior chamber of the spindle carrier support; and a deadpost mechanism attached to the body of the coil winding machine;

the tensioning device being positioned on the first portion of the body; and the eyelet bar, the spindle carrier support, the spindle carrier, and the deadpost being positioned on the first side of the exterior of the body, whereby the wire may be passed through the tensioning device and the eyelet bar, past the spindle carrier support and spindle carrier and anchored to the deadpost mechanism.

2. The coil winding machine of claim 1 wherein the body of the coil winding, machine includes a second portion and the spindle carrier support includes a first side, the second portion including a triple axes controller having three axes of movement, and the triple axes controller being attached to the first side of the spindle carrier support and the coil winding machine further includes a taping mechanism mounted on the triple axes controller of the second portion whereby the wire wound on the bobbin may be taped.

3. A coil winding machine of claim 2 wherein the triple axes controller of the second portion can impart a range of up to six inches of movement in each axes of movement to the taping mechanism.

4. The coil winding machine of claim 1 wherein the body of the coil winding machine includes a second portion and the spindle carrier support includes a first side, the second portion including a triple axes controller having three axes of movement, and the triple axes controller being attached to the first side of the spindle carrier support and the deadpost mechanism is mounted on the triple axes controller of the second portion of the body of the coil winding machine whereby the wire may be anchored to the deadpost mechanism.

5. A coil winding machine of claim 4 wherein the triple axes controller of the second portion can impart a range of up to six inches of movement in each axes of movement to the deadpost mechanism.

6. The coil winding machine of claim 1 wherein the coil winding machine has a second portion and the spindle carrier support includes a first side, the second portion includes a first triple axes controller and a second triple axes controller, each controller having three axes of movement and the first and second triple axes controllers are attached to the first side of the spindle carrier support; and the second triple axes controller straddles the first triple axes controller, the second triple axes controller is configured to accommodate a deadpost mechanism, and the first triple axes controller is configured to accommodate a taping mechanism.

7. The coil winding machine of claim 1 wherein the body of the coil winding machine includes a second portion and the spindle carrier support includes a first side, the second portion including a triple axes controller having three axes of movement, and the triple axes controller being attached to the first side of the spindle carrier support; and the triple axes controller includes three motors mounted to impart movement to an attachment plate in three separate perpendicular axes, the attachment plate being mounted on mounting plates having rails, the rails corresponding to each of the three motors which the mounting plates slidingly engage; and a taping mechanism mounted on the attachment plate whereby the wire wound on the bobbin may be taped.

8. The coil winding machine of claim 1 wherein the body of the coil winding machine includes a second portion and the spindle carrier support includes a first side, the second portion including a triple axes controller having three axes of movement, and the triple axes controller being attached to the first side of the spindle carrier support; and the triple axes controller includes a first motor, a second motor, a third motor, a first mounting plate, a second mounting plate, and a third mounting plate, and an attachment plate, the attachment plate being mounted on the first mounting plate, the second mounting plate including at least one sliding rail, the first mounting plate being slidably mounted on the sliding rail of the second mounting plate, the first motor being mounted on the second mounting plate, the third mounting plate having at least one sliding rail, the second mounting plate being slidably mounted on the sliding rail of the third mounting plate, the second motor being mounted on the third mounting plate, and the third motor being fixedly attached within the lower portion of the coil winding machine, wherein the first motor imparts sliding movement to the first mounting plate on the sliding rail of the second mounting plate, the second motor imparts sliding movement to the second mounting plate on the sliding rail of the third mounting plate, and the third motor imparts sliding movement to the third mounting plate on a third sliding rail fixedly attached within the lower portion of the coil winding machine; and a taping mechanism mounted on the attachment plate whereby the wire wound on the bobbin may be taped.

9. The coil winding machine of claim 8 wherein the first motor imparts lateral movement to the first mounting plate, the second motor imparts vertical movement to the second mounting plate, and the third motor imparts front-to-back movement to the third mounting plate.

10. A spindle carrier support and spindle carrier arrangement wherein the spindle carrier support comprises a top, a bottom, a first side, a second side, a front side, and an interior;

the front side including an opening centrally located on the front side and a separable spindle carrier mount;

the spindle carrier comprising a spindle mount, at least one spindle, and a second attachment means, the spindle mount having a first side and a second side, the spindle having a first end and a second end, the second end extending from the second side of the spindle mount and the first end extending from a first side of the mount;

wherein the separable spindle carrier mount of the spindle carrier support engages the second side of the spindle mount such that the second end of the spindle extends into the interior of the spindle carrier support through the opening.

11. A coil winding machine of the type usable to wind a wire into a coil mounted on a coil spindle, the coil winding machine comprising in combination:

a machine body with an exterior, an inner chamber, a first portion and a first side on the exterior;

a wire tensioning device mounted on the body;

an eyelet bar mounted on the body;

a spindle carrier support secured within the inner chamber of the body and comprising a support body, a spindle chamber, a spindle passage through the support body into the interior chamber, and a separable spindle carrier mount;

at least one spindle carrier including a spindle mount and at least one spindle for spinning the coil, the spindle mount having a first side and a second side, the spindle having a first end extending from the first side of the spindle mount and including an extension for holding the coil, and the second end extending from the second side of the spindle mount and including a portion to be driven to spin the coil, the spindle carrier being removably mounted on the separable spindle carrier mount of the spindle carrier support such that the second side of the spindle mount is adjacent the spindle carrier support and the second end of the spindle passes through the support body and into the interior chamber of the spindle carrier support; and a deadpost attached to the body of the coil winding machine;

the tensioning device being positioned on the first portion of the body; and the eyelet bar, the spindle carrier support, the spindle carrier, and the deadpost being positioned on the first side of the exterior of the body, whereby the wire may be passed through the tensioning device and the eyelet bar, past the spindle carrier support and spindle carrier and anchored to the deadpost.

12. A spindle carrier support having a front side, the front side having a centrally-located, generally rectangular opening and screw holes positioned around the opening, a top having at least one opening, and the first and second sides each having at least one opening; and a bottom.

13. The spindle carrier support of claim 12 wherein the front side includes two circular apertures located on opposite sides of the opening and such that a line drawn through the center points of the two circular apertures is parallel to the top.

14. The spindle carrier support of claim 12 wherein the top includes a first opening adjacent the front and the first side and a second opening adjacent the front and the second side wall, and a series of screw holes generally centrally-located.

15. The spindle carrier support of claim 12 wherein the bottom includes a series of screw holes generally centrally-located.

* * * * *